United States Patent
Kim et al.

(10) Patent No.: US 9,524,426 B2
(45) Date of Patent: Dec. 20, 2016

(54) MULTI-VIEW HUMAN DETECTION USING SEMI-EXHAUSTIVE SEARCH

(71) Applicant: GM GLOBAL TECHNOLOGY OPERATIONS LLC, Detroit, MI (US)

(72) Inventors: Kyungnam Kim, Oak Park, CA (US); Changsoo Jeong, Rancho Ralos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 14/219,109

(22) Filed: Mar. 19, 2014

(65) Prior Publication Data

US 2015/0269427 A1 Sep. 24, 2015

(51) Int. Cl.
*G06K 9/00* (2006.01)
*H04N 7/18* (2006.01)
*G06K 9/62* (2006.01)
*G06K 9/46* (2006.01)

(52) U.S. Cl.
CPC ....... *G06K 9/00369* (2013.01); *G06K 9/00771* (2013.01); *G06K 9/6269* (2013.01); *H04N 7/181* (2013.01); *G06K 9/4671* (2013.01)

(58) Field of Classification Search
CPC ............................ G06K 9/00369; H04N 7/181
USPC ........................................................ 348/159
See application file for complete search history.

(56) References Cited

U.S. PATENT DOCUMENTS

| | | | |
|---|---|---|---|
| 8,253,792 B2 * | 8/2012 | Wells | H04N 7/181 348/152 |
| 8,285,060 B2 | 10/2012 | Cobb et al. | |
| 9,251,598 B2 * | 2/2016 | Wells | G06T 7/2093 |
| 2010/0208063 A1 * | 8/2010 | Lee | G06K 9/00771 348/143 |
| 2012/0307051 A1 * | 12/2012 | Welter | G08B 13/2482 348/143 |
| 2013/0259310 A1 * | 10/2013 | Tsukamoto | G06K 9/00362 382/103 |

OTHER PUBLICATIONS

Xin Xu, Jinshan Tang, Xiaolong Zhang, Xiaoming Liu, Hong Zhang and Yimin Qiu, Exploring Techniques for Vision Based Human Activity Recognition: Methods, Systems, and Evaluation, Sensors 2013, Jan. 25, 2013, pp. 1635-1650, 13, www.mdpi.com/journal/sensors, Basel, Switzerland.

* cited by examiner

*Primary Examiner* — Behrooz Senfi
(74) *Attorney, Agent, or Firm* — Quinn Law Group, PLLC

(57) ABSTRACT

A human monitoring system includes a plurality of cameras and a visual processor. The plurality of cameras are disposed about a workspace area, where each camera is configured to capture a video feed that includes a plurality of image frames, and the plurality of image frames are time-synchronized between the respective cameras. The visual processor is configured to receive the plurality of image frames from the plurality of vision-based imaging devices and detect the presence of a human from at least one of the plurality of image frames using pattern matching performed on an input image. The input image to the pattern matching is a sliding window portion of the image frame that is aligned with a rectified coordinate system such that a vertical axis in the workspace area is aligned with a vertical axis of the input image.

18 Claims, 7 Drawing Sheets

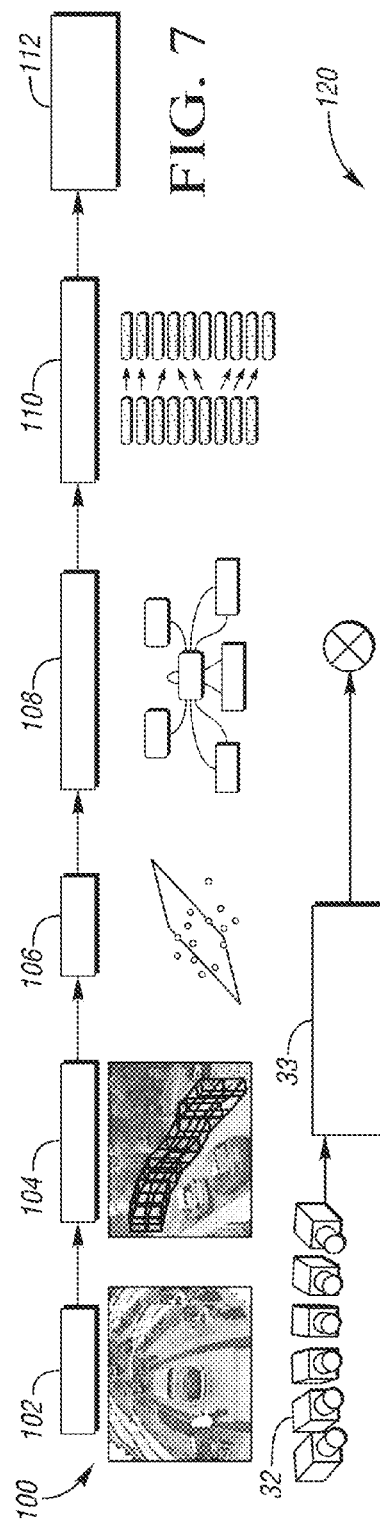
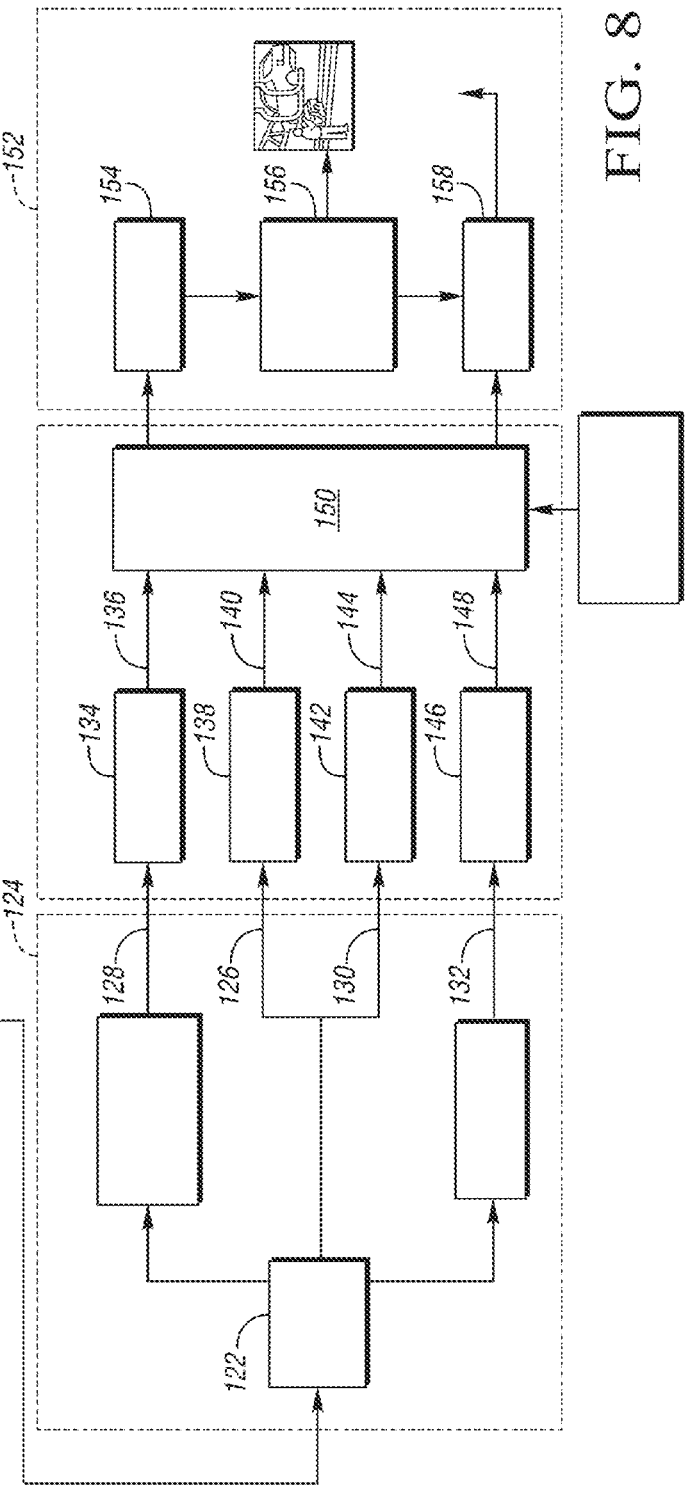

MULTI-VIEW HUMAN DETECTION USING SEMI-EXHAUSTIVE SEARCH

TECHNICAL FIELD

The present invention relates generally to vision monitoring systems for tracking humans.

BACKGROUND

Factory automation is used in many assembly contexts. To enable more flexible manufacturing processes, systems are required that allow robots and humans to cooperate naturally and efficiently to perform tasks that are not necessarily repetitive. Human-robot interaction requires a new level of machine awareness that extends beyond the typical record/playback style of control, where all parts begin at a known location. In this manner, the robotic control system must understand the human position and behavior, and then must adapt the robot behavior based on the actions of the human.

SUMMARY

A human monitoring system includes a plurality of cameras and a visual processor. The plurality of cameras are disposed about a workspace area, where each camera is configured to capture a video feed that includes a plurality of image frames, and the plurality of image frames are time-synchronized between the respective cameras.

The visual processor is configured to receive the plurality of image frames from the plurality of vision-based imaging devices and detect the presence of a human from at least one of the plurality of image frames using pattern matching performed on an input image. The input image to the pattern matching is a sliding window portion of the image frame that is aligned with a rectified coordinate system such that a vertical axis in the workspace area is aligned with a vertical axis of the input image.

If a human is detected proximate to the automated moveable equipment, the system may provide an alert and/or alter the behavior of the automated moveable equipment.

In one configuration, the rectified coordinate system may be established according to at least one of a perspective of the workspace area within the at least one image frame, and a vanishing point of the at least one image frame.

The pattern matching includes at least one of a support vector machine and a neural network, and may be configured to detect the pose of the human in addition to the human's presence within the image frame. The pose may include at least one of standing, walking, reaching, and crouching.

In one configuration, the visual processor is configured to select the sliding window from a region of interest within the at least one image frame. The region of interest is a subset of the at least one image frame, where it is possible for a human to be located. The region of interest includes a portion of the floor of the workspace area that is viewable from the image frame. The sliding window may traverse the entire region of interest in a first image frame prior to detecting the presence of a human in a subsequent image frame. In one configuration, the visual processor may use a position and a velocity of a detected human in a first frame to prioritize the detection in a subsequent frame.

The visual processor is further configured to fuse the time-synchronized image frames from the plurality of views into a common coordinate system, such as a ground plane. Once in a common coordinate system, the visual processor may identify the location of the detected human by mapping a representation of the human from the plurality of views into the common coordinate system, and by determining a point of intersection of the mapped representations. The visual processor may then assemble a motion track of the detected human according to the identified location across a plurality of successive image frames.

In one configuration, the visual processor may compare a determined motion track to a predetermined, expected motion track. It may then provide an alert if the motion track is not similar to the expected motion track.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic high-level flow diagram of a method of performing activity sequence monitoring using human monitoring system.

FIG. 8 is a schematic detailed flow diagram of a method of performing activity sequence monitoring using human monitoring system.

DETAILED DESCRIPTION

Figure 1:
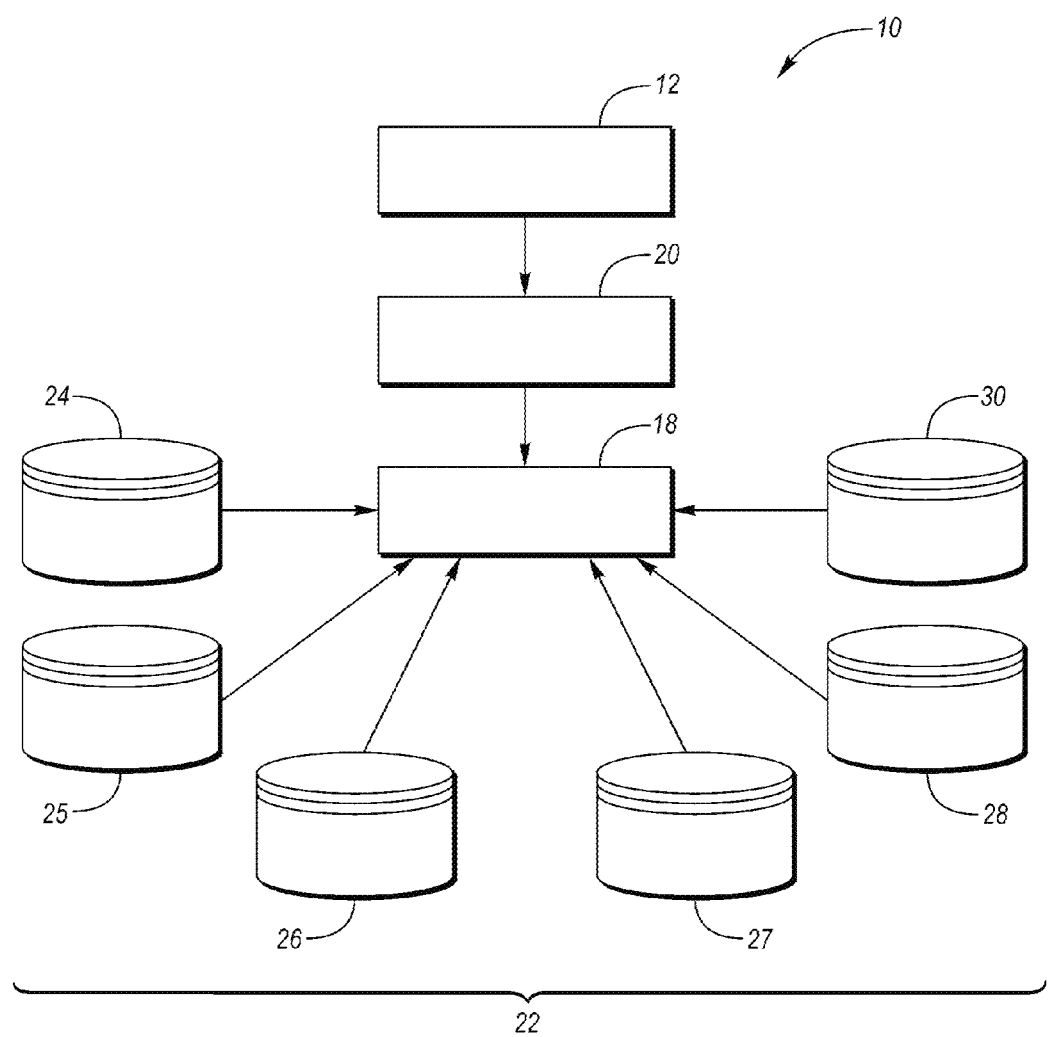
FIG. 1 is a schematic block diagram of a human monitoring system.
Figure 2:
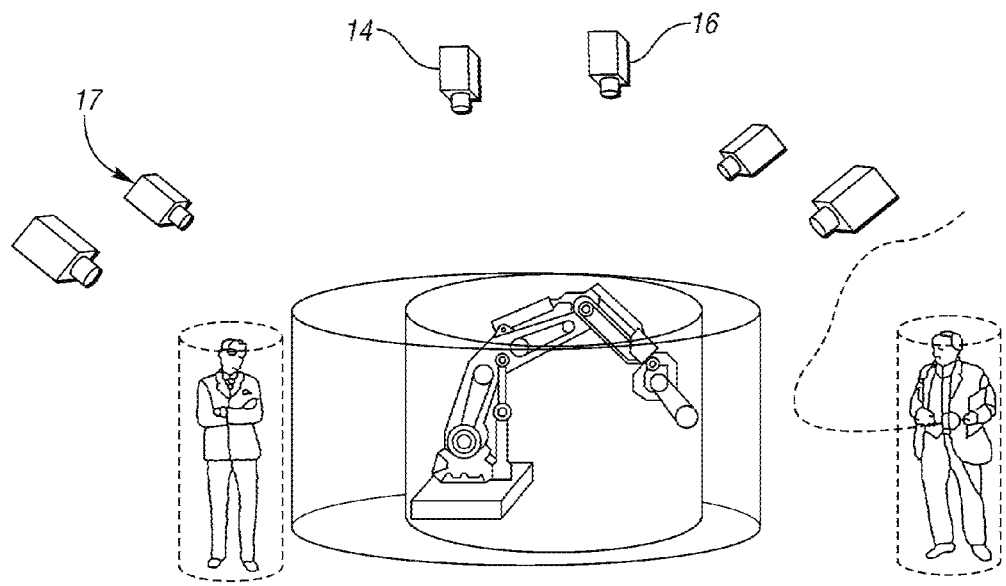
FIG. 2 is a schematic illustration of a plurality of imaging devices positioned about a workspace area.

Referring to the drawings, wherein like reference numerals are used to identify like or identical components in the various views, FIG. 1 schematically illustrates a block diagram of a human monitoring system 10 for monitoring a workspace area of an assembly, manufacturing, or like process. The human monitoring system 10 includes a plurality of vision-based imaging devices 12 for capturing visual images of a designated workspace area. The plurality of vision-based imaging devices 12, as illustrated in FIG. 2, is positioned at various locations and elevations surrounding the automated moveable equipment. Preferably, wide-angle lenses or similar wide field of view devices are used to visually cover more workspace area. Each of the vision-based imaging devices are substantially offset from one another for capturing an image of the workspace area from a respective viewpoint that is substantially different from the other respective imaging devices. This allows various streaming video images to be captured from different viewpoints about the workspace area for distinguishing a person from the surrounding equipment. Due to visual obstructions (i.e., occlusions) with objects and equipment in the workspace area, the multiple viewpoints increase the likelihood of capturing the person in one or more images when occlusions within the workspace area are present.

As shown in FIG. 2, a first vision-based imaging device 14 and a second vision-based imaging device 16 are substantially spaced from one another at overhead positions such that each captures a high angle view. The imaging devices 14 and 16 provide high-angle canonical views or reference views. Preferably, the imaging devices 14 and 16 provide for stereo-based three-dimensional scene analysis and tracking The imaging devices 14 and 16 may include visual imaging, LIDAR detection, infrared detection, and/or any other type of imaging that may be used to detect physical objects within an area. Additional imaging devices may be positioned overhead and spaced from the first and second vision-based imaging device 14 and 16 for obtaining additional overhead views. For ease of description the imaging devices 14 and 16 may be generically referred to as "cameras," though it should be recognized that such cameras need not be visual spectrum cameras, unless otherwise stated.

Various other vision-based imaging devices 17 ("cameras") are positioned to the sides or virtual corners of the monitored workspace area for capturing mid-angle views and/or low angle views. It should be understood that more or less imaging devices than shown in FIG. 2 may be used since the number of vision-based imaging devices is reconfigurable as the system can work with any number of imaging devices; however, it is pointed out that as the number of redundant imaging devices increases, the level of integrity and redundant reliability increases. Each of the vision-based imaging devices 12 are spaced from one another for capturing an image from a viewpoint that is substantially different from one another for producing three dimensional tracking of one or more persons in the workspace area. The various views captured by the plurality of vision-based imaging devices 12 collectively provide alternative views of the workspace area that enable human monitoring system 10 to identify each person in the workspace area. These various viewpoints provide the opportunity of tracking each person throughout the workspace area in three dimensional space and enhance the localization and tracking of each person as they move through the workspace area for detecting potential unwanted interactions between each respective person and the moving automated equipment in the workspace area.

Referring again to FIG. 1, the images captured by the plurality of vision-based imaging devices 12 are transferred to a processing unit 18 via a communication medium 20. The communication medium 20 can be a communication bus, Ethernet, or other communication link (including wireless).

The processing unit 18 is preferably a host computer implemented with commodity components (not unlike a personal computer) or similar device appropriately packaged for its operating environment. The processing unit 18 may further include an image acquisition system (possibly comprised of a frame grabber and/or network image acquisition software) that is used to capture image streams for processing and recording image streams as time synchronized data. Multiple processing units can be interconnected on a data network using a protocol that ensures message integrity such as Ethernet-Safe. Data indicating the status of adjoining space supervised by other processing units can be exchanged in a reliable way including alerts, signals, and tracking status data transfers for people, objects moving from area to area or zones that span multiple systems. The processing unit 18 utilizes a primary processing routine and a plurality of sub-processing routines (i.e., one sub-processing routine for each vision-based imaging device). Each respective sub-processing routine is dedicated to a respective imaging device for processing the images captured by the respective imaging device. The primary processing routine performs multi-view integration to perform real-time monitoring of the workspace area based on the cumulative captured images as processed by each sub-processing routine.

In FIG. 1, a detection of a worker in the workspace area is facilitated by the sub-processing routines using a plurality of databases 22 that collectively detect and identify humans in the presence of other moveable equipment in the workspace area. The plurality of databases store data which is used to detect objects, identifies a person from the detected objects, and tracks an identified person in the workspace area. The various databases include, but are not limited to, a calibration database 24, a background database 25, a classification database 26, a vanishing point database 27, a tracking database 28, and a homography database 30. Data contained in the databases are used by the sub-processing routines to detect, identify, and track humans in the workspace area.

The calibration database 24 provides camera calibration parameters (intrinsic and extrinsic) based on patterns for undistorting distorted objects. In one configuration, the calibration parameters may be determined using a regular pattern, such as a checkerboard, that is displayed orthogonally to the field of view of the camera. A calibration routine then uses the checkerboard to estimate the intrinsic and undistortion parameters that may be used to undistort barrel distortions caused by the wide angle lenses.

The background database 25 stores the background models for different views and the background models are used to the separate an image into its constituent background and foreground regions. The background models may be obtained by capturing images/video prior to installing any automated machinery or placing any dynamic objects into the workspace.

The classification database 26 contains a cascade of classifiers and related parameters for automatically classifying humans and non-humans.

The vanishing point database 27 contains the vanishing point information for each of the camera views and is used to do the vanishing point correction so that humans appear upright in the corrected imagery.

The tracking database 28 maintains tracks for each of the humans being monitored, new tracks are added to the database when new humans enter the scene and deleted when they leave the scene. The tracking database also has information on the appearance model for each human so that existing tracks can easily be associated with tracks at a different time step.

The homography database 30 contains the homography transformation parameters across the different views and the canonical view. Appropriate data from the database(s) can be transferred to a system supervising an adjoining area as a person travels into that area such that the seamless transition of tracking the person from area to area across multiple systems is enabled.

Each of the above-described databases may contain parameters that are the result of various initialization routines that are performed during the installation and/or maintenance of the system. The parameters may be stored, for example, in a format that is readily accessible by the processor during operation, such as an XML file format. In one configuration, during initial setup/initialization routine, the system may perform a lens calibration routine, such as by placing a checkerboard image within the field of view of each camera. Using the checkerboard image, the lens calibration routine may determine the required amount of correction that is needed to remove any fish eye distortion. These correction parameters may be stored in the calibration database 24.

Following the lens calibration routine, the system may then determine the homography transformation parameters, which may be recorded in the homography database 30. This routine may include placing fiducial objects within the workspace such that they can be viewed by multiple cameras. By correlating the location of the objects between the various views (and while knowing the fixed position of either the cameras or the objects) the various two dimensional images may be mapped to 3D space.

Additionally, the vanishing point of each camera may be determined by placing a plurality of vertical reference markers at different locations within the workspace, and by analyzing how these markers are represented within each camera view. The perspective nature of the camera may cause the representations of the respective vertical markers to converge to a common vanishing point, which may be recorded in the vanishing point database 27.

Figure 3:
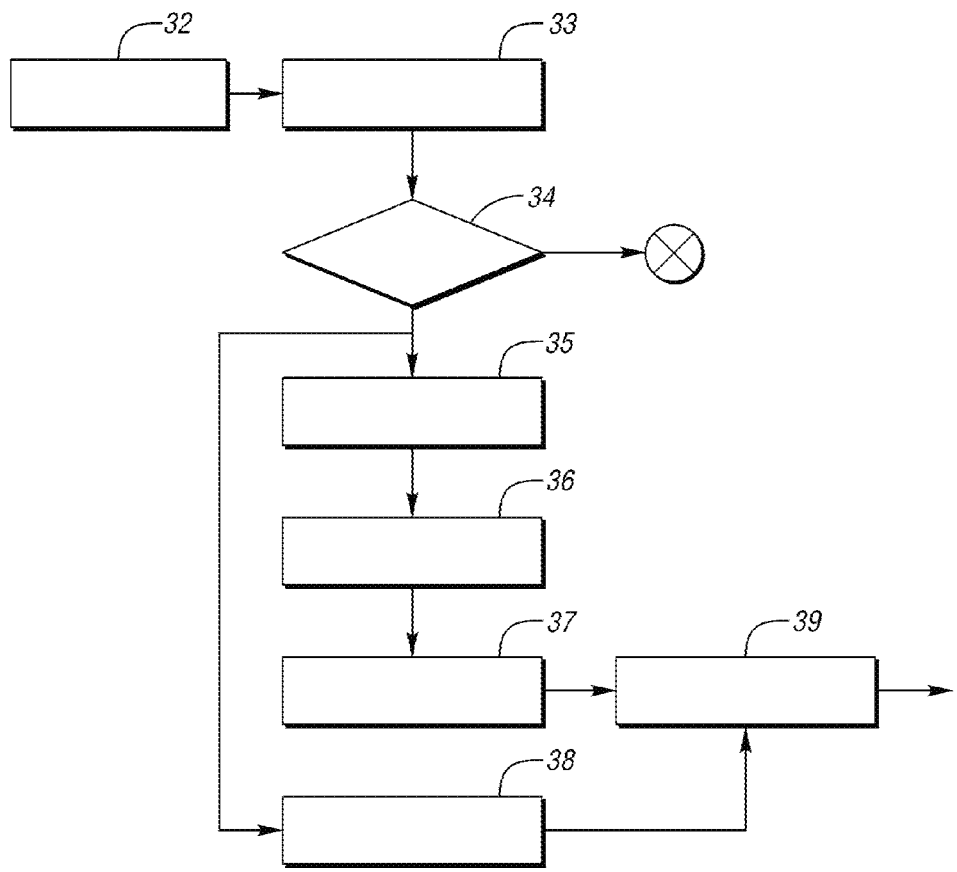
FIG. 3 is a schematic block diagram of an activity monitoring process.

FIG. 3 illustrates a block diagram of a high level overview of the factory monitoring process flow including dynamic system integrity monitoring.

In block 32, data streams are collected from the vision-based imaging devices 12 that capture the time synchronized image data. In block 33, system integrity monitoring is executed. The visual processing unit checks the integrity of the system for component failures and conditions that would prevent the monitoring system from operating properly and fulfilling its intended purpose. This "dynamic integrity monitoring" would detect these degraded or failure conditions and trigger a mode where the system can fail to a safe mode where system integrity can then be restored and the process interaction can return to normal without any unintended consequences besides the downtime needed to effect repairs.

In one configuration, fiducial targets can be used for geometric calibration and integrity. Some of these fiducial targets could be active such as a flashing IR beacon in the field of view of a sensor(s). In one configuration, for example, the IR beacon may be flashed at a respective rate. The monitoring system may then determine if the beacon detection in the images actually coincides with the expected rate at which the IR beacon actually flashes. If it does not, then the automated equipment may fail to a safe mode, a faulty view may be disregarded or deactivated, or the equipment can be modified to operate in a safe mode.

Unexpected changes in the behavior of a fiducial target may also result in modifying the equipment to work in the safe mode operation. For example, if a fiducial target is a moving target that is tracked, and it disappears prior to the system detecting it exiting the workspace area from an expected exiting location, then similar precautions may be taken. Another example of unexpected changes to a moving fiduciary target is when the fiduciary target appears at a first location and then re-appears at a second location at an unexplainably fast rate (i.e., a distance-to-time ratio that exceeds a predetermined limit). In block 34 of FIG. 3, if the visual processing unit determines that integrity issues exist, then the system enters fail-to-safe mode where alerts are actuated and the system is shut down. If the visual processing unit determines that no integrity issues are present then blocks 35-39 are initiated sequentially.

In one configuration, the system integrity monitoring 33 may include quantitatively assessing the integrity of each vision-based imaging device in a dynamic manner. For example, the integrity monitoring may continuously analyze each video feed to measure the amount of noise within a feed or to identify discontinuities in the image over time. In one configuration, the system may use at least one of an absolute pixel difference, a global and/or a local histogram difference, and/or absolute edge differences to quantify the integrity of the image (i.e. to determine a relative "integrity score" that ranges from 0.0 (no reliability) to 1.0 (perfectly reliable)). The differences mentioned may be determined with respect to either a pre-established reference frame/image (e.g., one acquired during an initialization routing), or a frame that was acquired immediately prior to the frame being measured. When comparing to a pre-established reference frame/image, the algorithm may particularly focus on one or more portions of the background of the image (rather than the dynamically changing foreground portions).

The background subtraction is performed in block 35 and the resulting images are the foreground regions. Background subtraction enables the system to indentify those aspects of the image that may be capable of movement. These portions of the image frames are then passed to subsequent modules for further analysis.

In block 36, human verification is performed for detecting humans from the captured images. In this step, the identified foreground images are processed to detect/identify portions of the foreground that are most likely human.

In block 37, appearance matching and tracking is executed as described earlier, which identifies a person from the detected objects using its various databases, and tracks an identified person in the workspace area.

In block 38, three dimensional processing is applied to the captured data to obtain 3D range information for the objects in the workspace area. The 3D range information allows us to create 3D occupancy grids and voxelizations that reduce false alarms and allows us to track objects in 3D. The 3D metrology processing may be performed, for example, using the stereoscopic overhead cameras (e.g., cameras 14, 16), or may be performed using voxel construction techniques from the projection of each angled camera 17.

Figure 10:
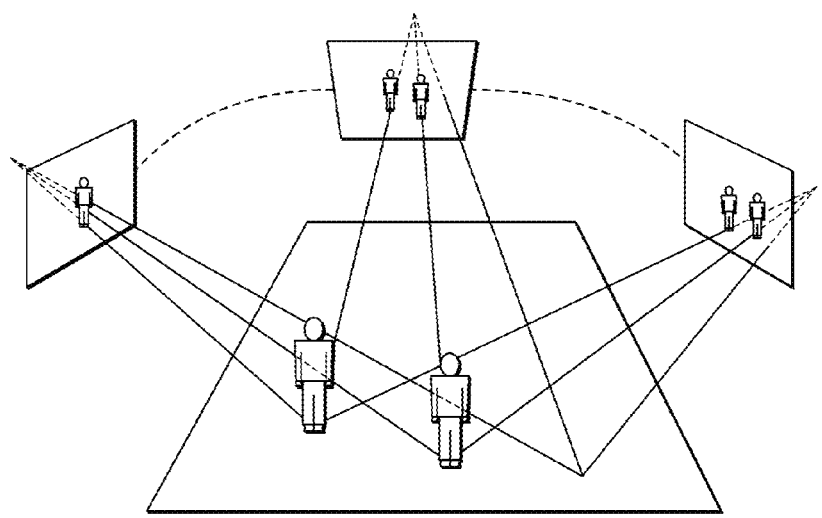
FIG. 10 is a schematic illustration of three dimensional localization using multiple sensor views.

In block 39, the matched tracks are provided to multi-view fusion and object localization module. The multi-view fusion module 39 may fuse the various views together to form a probabilistic map of the location of each human within the workspace. In addition, three dimensional processing from the vision-based imaging devices, as shown in FIG. 10, are provided to the multi-view fusion and object localization module for determining the location, direction, speed, occupancy, and density of each human within the workspace area. The identified humans are tracked for potential interaction with moveable equipment within the workspace area.

Figure 4:
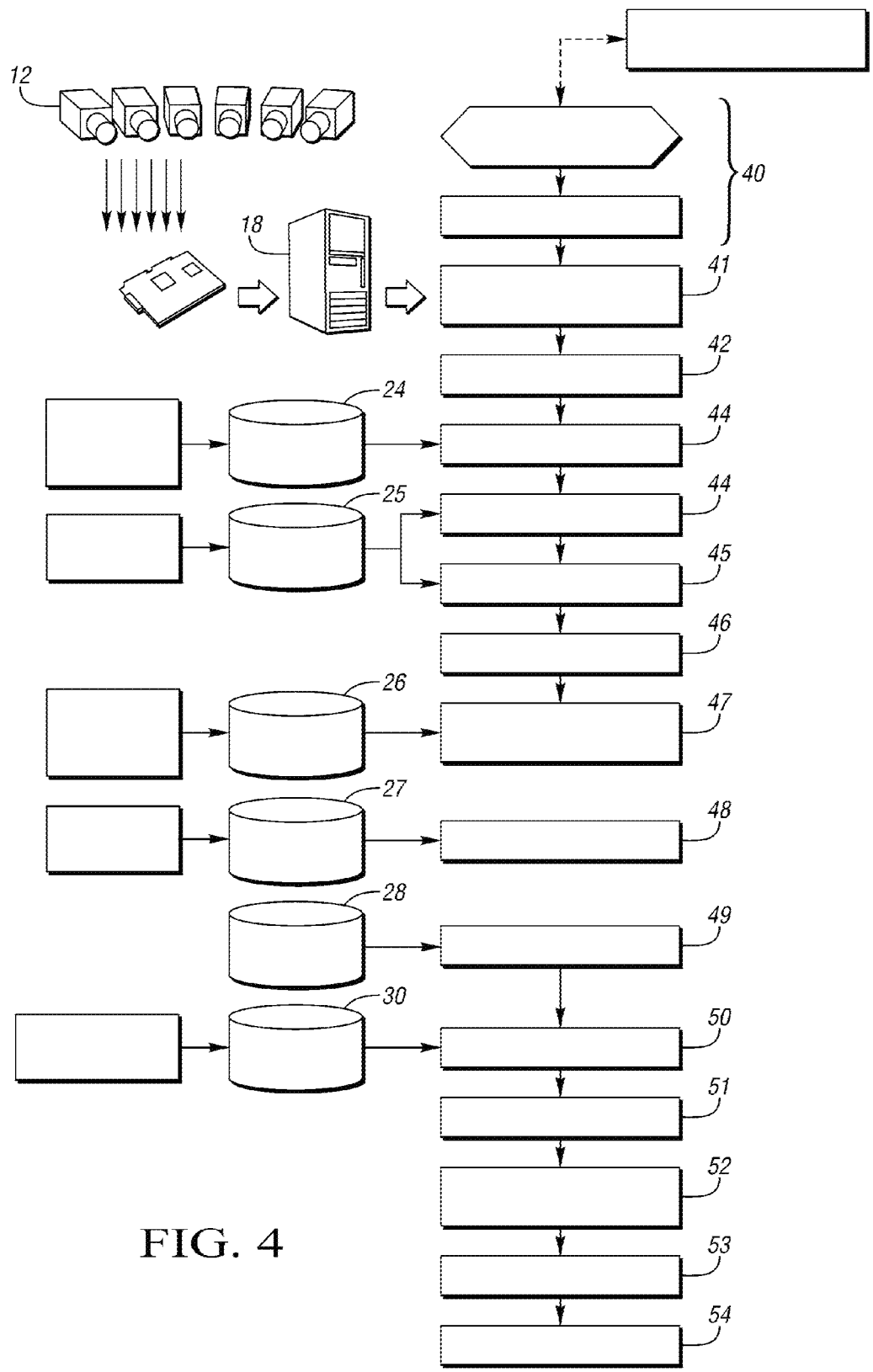
FIG. 4 is a schematic process flow diagram for detecting the motion of a human using a plurality of imaging devices positioned about a workspace area.

FIG. 4 illustrates a process flow diagram for detecting, identifying and tracking humans using the human monitoring system. In block 40, the system is initialized by the primary processing routine for performing multi-view integration in the monitored workspace area. The primary processing routine initializes and starts the sub-processing routines. A respective sub-processing routine is provided for processing the data captured by a respective imaging device. Each of the sub-processing routines operates in parallel. The following processing blocks, as described herein, are synchronized by the primary processing routine to ensure that the captured images are time synchronized with one another. The primary processing routine waits for each of the sub-processing routines to complete processing of their respective captured data before performing the multi-view integration. The processing time for each respective sub-processing routine is preferably no more than 100-200 msec. Also performed at system initialization is a system integrity check (see also FIG. 3, block 33). If it is determined that the system integrity check is failed, then the system immediately enables an alert and enters a fail-to-safe mode where the system is shut down until corrective actions are performed.

Referring again to FIG. 4, in block 41, streaming image data is captured by each vision-based imaging device. The data captured by each imaging devices is in (or converted to) pixel form. In block 42, the captured image data is provided to an image buffer where the images await processing for detecting objects, and more specifically, humans in the workspace area amongst the moving automated equipment. Each captured image is time stamped so that each captured image is synchronized for processing concurrently.

In block 43, auto-calibration is applied to the captured images for undistorting objects within the captured image. The calibration database provides calibration parameters based on patterns for undistorting distorted objects. The image distortion caused by wide-angle lenses requires that the image be undistorted through the application of camera calibration. This is needed since any major distortion of the image makes the homography mapping function between the views of the image device and the appearance models inaccurate. Imaging calibration is a one-time process; however, recalibration is required when the imaging device setup is modified. Image calibration is also periodically checked by the dynamic integrity monitoring subsystem to detect conditions where the imaging device is somehow moved from its calibrated field of view.

In blocks 44 and 45, background modeling and foreground detection is initiated, respectively. Background training is used to differentiate background images from foreground images. The results are stored in a background database for use by each of the sub-processing routines for differentiating the background and foreground. All undistorted images are background-filtered to obtain foreground pixels within a digitized image. To distinguish the background in a captured image, background parameters should be trained using images of an empty workspace viewing area so that the background pixels can be readily distinguished when moving objects are present. The background data should be updated over time. When detecting and tracking a person in the captured image, the background pixels are filtered from the imaging data for detecting foreground pixels. The detected foreground pixels are converted to blobs through connected component analysis with noise filtering and blob size filtering.

In block 46, blob analysis is initiated. In a respective workspace area, not only can a moving person be detected, but other moving objects such as robot arms, carts, or boxes may be detected. Therefore, blob analysis involves detecting all the foreground pixels and determining which foreground images (e.g., blobs) are humans and which are non-human moving objects.

A blob may be defined as a region of connected pixels (e.g., touching pixels). Blob analysis involves the identification and analysis of the respective region of pixels within the captured image. The image distinguishes pixels by a value. The pixels are then identified as either a foreground or a background. Pixels with non-zero value are considered foreground and pixels with zero value are considered background. Blob analysis typically considers various factors that may include, but is not limited to, the location of the blob, the area of the blob, the perimeter (e.g., edges) of the blob, the shape of the blob, the diameter, length, or width of the blob, and orientation. Techniques for image or data segmentation are not limited to 2D images but can also leverage the output data from other sensor types that provide IR images and/or 3D volumetric data.

In block 47, human detection/verification is performed to filter out non-human blobs from the human blobs as part of the blob analysis. In one configuration, this verification may be performed using a swarming domain classifier technique.

Figure 5A:
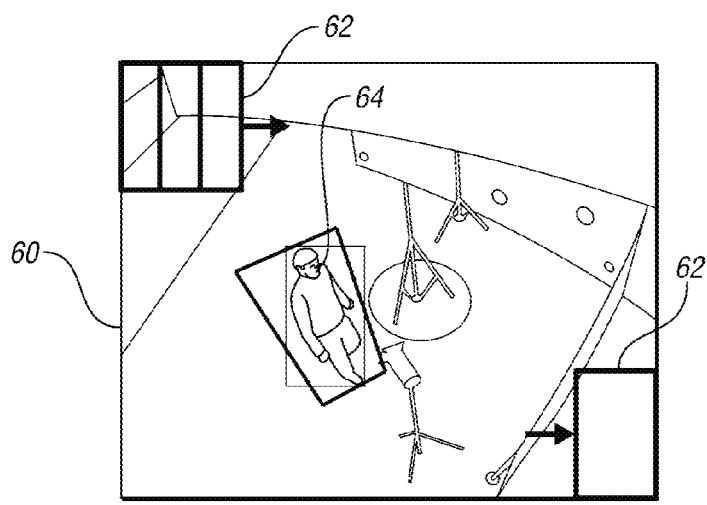
FIG. 5A is a schematic representation of an image frame including a sliding window input to a pattern matching algorithm traversing the image frame in image coordinate space.

In another configuration, the system may use pattern matching algorithms, such as support vector machines (SVMs) or neural networks, to pattern match foreground blobs with trained models of human poses. Rather than attempting to process the entire image as a single entity, the system may instead scan the image frame 60 using a localized sliding window 62, such as generally shown in FIG. 5A. This may reduce processing complexity and improve the robustness and specificity of the detection. The sliding window 62 may then serve as the input to the SVM for the purpose of identification.

The models that perform the human detection may be trained using images of different humans positioned in different postures (i.e., standing, crouching, kneeling, etc.) and facing in different directions. When training the model, the representative images may be provided such that the person is generally aligned with the vertical axis of the image. As shown in FIG. 5A, however, the body axis of an imaged person 64 may be angled according to the perspective and vanishing point of the image, which is not necessarily vertical. If the input to the detection model was a window aligned with the image coordinate frame the angled representation person may negatively affect the accuracy of the detection.

Figure 5B:
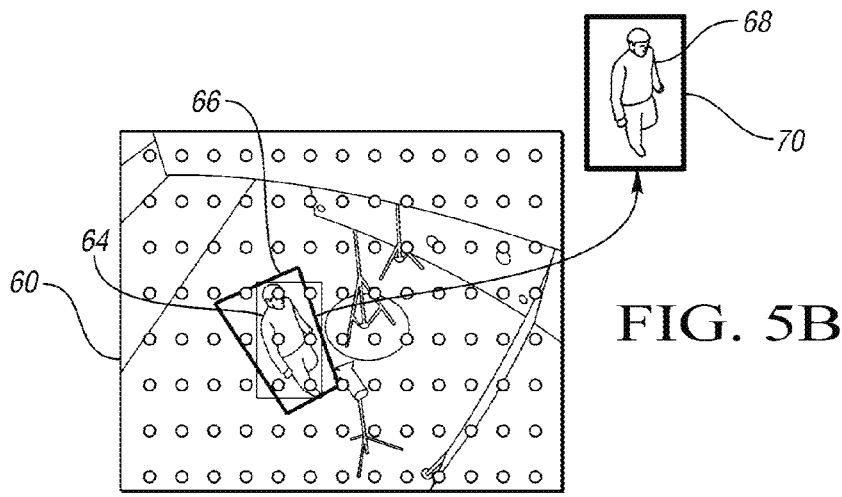
FIG. 5B is a schematic representation of an image frame including a sliding window input to a pattern matching algorithm traversing the image frame in a rectified coordinate space.

To account for the skewed nature of people in the image, the sliding window 62 may be taken from a rectified space rather than from the image coordinate space. The rectified space may map the perspective view to a rectangular view aligned with the ground plane. Said another way, the rectified space may map a vertical line in the workspace area to be vertically aligned within an adjusted image. This is schematically shown in FIG. 5B, where a rectified window 66 scans the image frame 60, and can map an angled person 64 to a vertically aligned representation 68 provided in a rectangular space 70. This vertically aligned representation 68 may then provide for a higher confidence detection when analyzed using the SVM. In one configuration, the rectified sliding window 66 may be facilitated by a correlation matrix that can map between, for example, a polar coordinate system and a rectangular coordinate system.

Figure 5C:
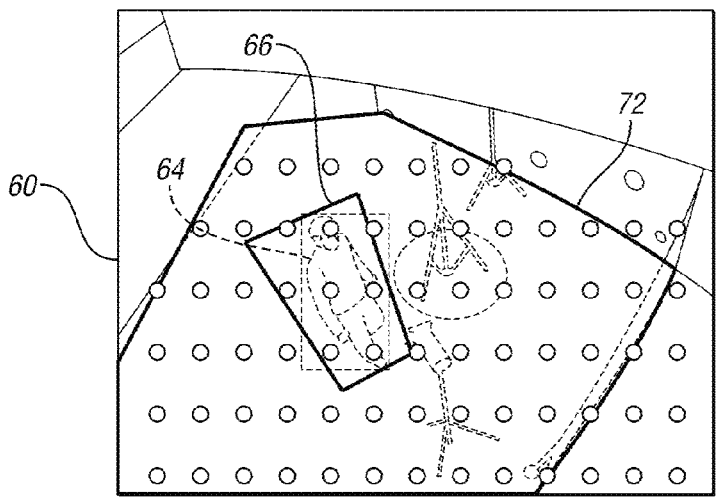
FIG. 5C is a schematic representation of the image frame of FIG. 5B, where the sliding window input is selected from a specific region of interest.

While in one configuration the system may perform an exhaustive search across the entire image frame using the above-described sliding window search strategy, this strategy may involve searching areas of the image where humans may not physically be located. Therefore, in another configuration, the system may limit the search space to only a particular region of interest 72 (ROI), such as shown in FIG. 5C. In one configuration, the ROI 72 may represent the viewable floor space within the image frame 60, plus a marginal tolerance to account for a person standing at the extreme edge of the floor space.

In still a further configuration, the computational requirements may be even further reduced by prioritizing the search around portions of the ROI 72 where human blobs are expected to be found. In this configuration, the system may use cues to constrain or prioritize the search based on supplementary information available to the image processor. This supplementary information may include motion detection within the image frame, trajectory information from a prior-identified human blob, and data-fusion from other cameras in the multi-camera array. For example, after verification of a human location on the fused ground frame, the tracking algorithm creates a human track and keeps the track history over following frames. If an environmental obstruction makes human localization fail in one instance, the system may quickly recover the human location by extrapolating the trajectory of the prior tracked human location to focus the rectified search within the ROI 72. If the blob is not re-identified in several frames, the system may report that the target human has disappeared.

Referring again to FIG. 4, once the human blobs are detected in the various views, body-axis estimation is executed in block 48 for each detected human blob. A principle body-axis line for each human blob is determined using vanishing points (obtained from the vanishing point database) in the image. In one configuration, the body-axis line may be defined by two points of interest. The first point is a centroid point of the identified human blob and the second point (i.e., vanishing point) is a respective point near a body bottom (i.e., not necessarily the blob bottom and possibly outside of the blob). More specifically, the body-axis line is a virtual line connecting the centroid point to the vanishing point. A respective vertical body-axis line is determined for each human blob in each respective camera view, as illustrated generally at 80, 82, and 84 of FIG. 6. In general, this line will transect the image of the human on a line from head to toe. A human detection score may be used to assist in a determination of a corresponding body-axis. The score provides a confidence level that a match to the human has been made and that the corresponding body-axis should be used. Each vertical body-axis line will be used via homography mapping to determine localization of the human and will be discussed in detail later.

Referring again to FIG. 4, color profiling is executed in block 49. A color appearance model is provided for matching the same person in each view. A color profile both fingerprints and maintains the identity of the respective person throughout each captured image. In one configuration, the color profile is a vector of averaged color values of the body-axis line with the blob's bounding box.

In blocks 50 and 51, homography mapping and multi-view integration routines are executed to respectively coordinate the various views, and map the human location to a common plane. Homography (as used herein) is a mathematical concept where an invertible transformation maps objects from one coordinate system to a line or plane.

The homography mapping module 50 may include at least one of a body axis submodule and a synergy submodule. In general, the body axis submodule may use homography to map the detected/computed body-axis lines into a common plane that is viewed from an overhead perspective. In one configuration, this plane is a ground plane that is coincident with the floor of the workspace. This mapping is schematically illustrated via the ground plane map at 86 in FIG. 6. Once mapped into the common ground plane, the various body-axis lines may intersect at or near a single location point 87 in the ground plane. In an instance where the body-axis lines do not perfectly intersect, the system may use a least mean squares, or least median squares approach to identify a best-fit approximation of the location point 87. This location point may represent one estimation of the human's ground plane location within the workspace. In another embodiment, the location point 87 may be determined through a weighted least squares approach, where each line may be individually weighted using the integrity score that is determined for frame/view from which the line was determined.

The synergy submodule may operate similar to the body axis submodule in that it uses homography to map content from different image views into planes that are each perceived from an over-head perspective. Instead of mapping a single line (i.e., the body-axis line), however, the synergy submodule instead maps the entire detected foreground blob to the plane. More specifically, the synergy submodule uses homography to map the foreground blob into a synergy map 88. This synergy map 88 is a plurality of planes that are all parallel, and each at a different height relative to the floor of the workspace. The detected blobs from each view may be mapped into each respective plane using homography. For example, in one configuration, the synergy map 88 may include a ground plane, a mid plane, and a head plane. In other configurations, more or less planes may be used.

During the mapping of a foreground blob from each respective view into a common plane, there may be an area where multiple blob-mappings overlap. Said another way, when the pixels of a perceived blob in one view are mapped to a plane, each pixel of the original view has a corresponding pixel in the plane. When multiple views are all projected to the plane, they are likely to intersect at an area such that a pixel in the plane from within the intersection area may map to multiple original views. This area of coincidence within a plane reflects a high probability of human presence at that location and height. In a similar manner as the body-axis submodule, the integrity score may be used to weight the projections of the blobs from each view into the synergy map 88. As such, the clarity of the original image may affect the specific boundaries of the high probability area.

Once the blobs from each view are mapped to the respective planes, the high probability areas may be isolated and areas along a common vertical axis may be grouped together. By isolating these high probability areas at different heights, the system may construct a bounding envelope that encapsulates the detected human form. The position, velocity, and/or acceleration of this bounding envelope may then be used to alter the behavior of adjacent automated equipment, such as an assembly robot, or to provide an alert, for example, if a person were to step or reach into a defined protection zone. For example, if the bounding envelope overlaps with, or impinges upon a designated restricted volume, the system may alter the performance of an automated devices within the restricted volume (e.g., may slow down or stop a robot). Additionally, the system may anticipate the movement of the object by monitoring the velocity and/or acceleration of the object, and may alter the behavior of the automated device if a collision or interaction is anticipated.

In addition to merely identifying the bounding envelope, the entirety of the envelope (and/or the entirety of each plane) may be mapped down to the ground plane to determine a likely floor area that is occupied. In one configuration, this occupied floor area may be used to validate the location point 87 determined by the body-axis submodule. For example, the location point 87 may be validated if it lies within high probability occupied floor area as determined by the synergy submodule. Conversely, the system may identify an error or reject the location point 87 if the point 87 lies outside of the area.

In another configuration, a primary axis may be drawn through the bounding envelope such that the axis is substantially vertical within the workspace (i.e., substantially perpendicular to the ground plane). The primary axis may be drawn at a mean location within the bounding envelope, and may intersect the ground plane at a second location point. This second location point may be fused with the location point 87 determined via the body-axis submodule.

Figure 6:
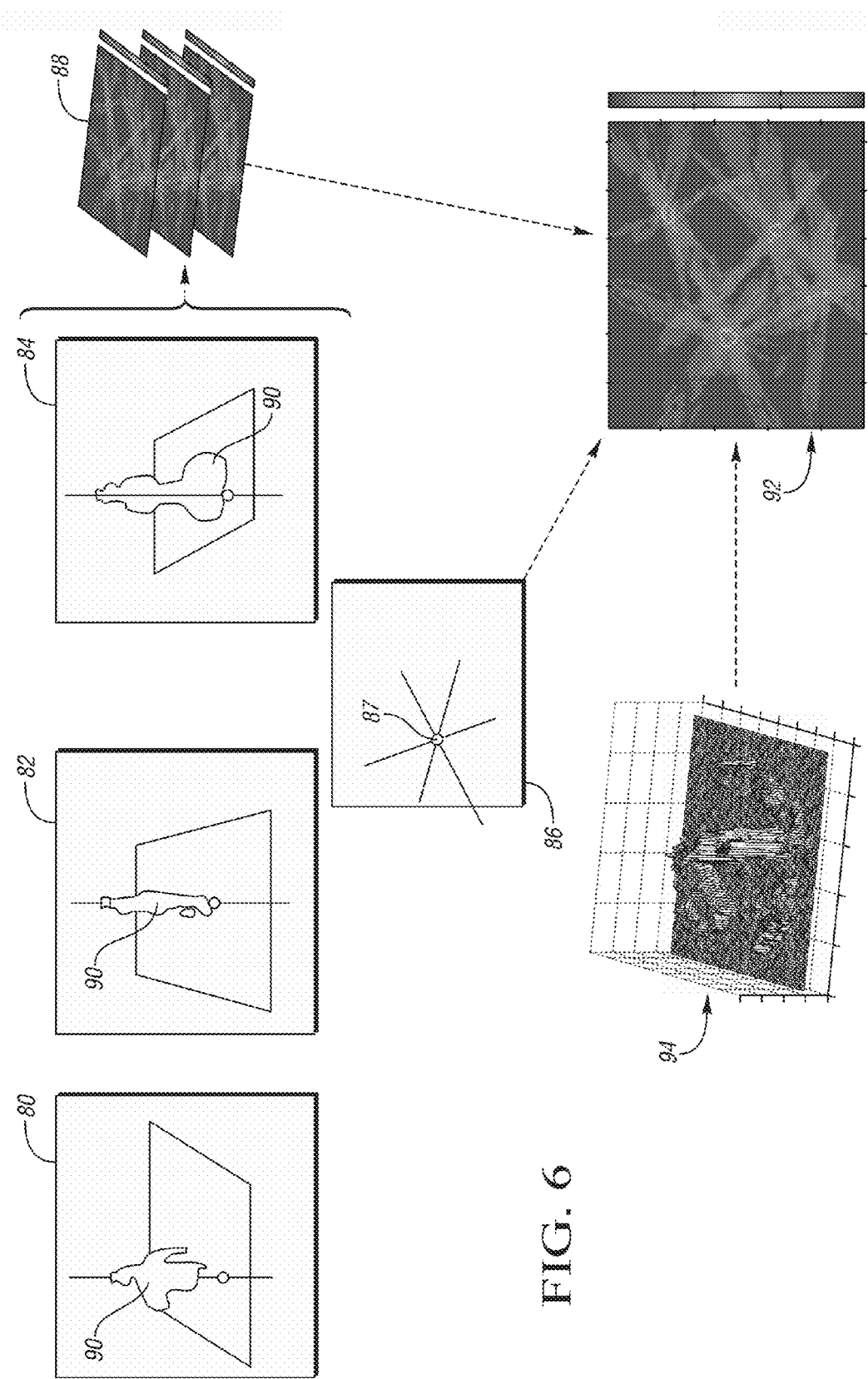
FIG. 6 is a schematic diagram illustrating a manner of fusing a plurality of representations of a detected human, each from a different camera, into a common coordinate system.

In one configuration, multi-view integration 51 may fuse multiple different types of information together to increase the probability of an accurate detection. For example, as shown in FIG. 6, the information within the ground plane map 86 and the information within the synergy map 88 may be fused together to form a consolidated probability map 92. To further refine the probability map 92, the system 10 may additionally fuse 3D stereo or constructed voxel representations 94 of the workspace into the probability estimates. In this configuration, the 3D stereo may use scale-invariant feature transforms (SIFTs) to first obtain features and their correspondences. The system may then perform epipolar rectification to both stereo pairs based on the known camera intrinsic parameters and the feature correspondences. A disparity (depth) map may then be obtained in real-time using a block matching method provided, for example, in OpenCV.

Similarly, the voxel representation uses the image silhouettes obtained from background subtraction to generate a depth representation. The system projects 3D voxels onto all the image planes (of the multiple cameras used) and determines if the projection overlaps with silhouettes (foreground pixels) in most images. Since certain images may be occluded due to robots or factory equipment, the system may use a voting scheme that doesn't directly require overlapping agreement from all images. The 3D stereo and voxel results offer information about how the objects occupy the 3D space, which may be used to enhance the probability map 92.

Developing the probability map 92 by fusing together various types of data may be accomplished in several different manners. The simplest is a 'simple weighted mean integration' approach, which applies a weighting coefficient to each data type (i.e., the body axis projection, synergy map 88, the 3D stereo depth projection, and/or the voxel representation). Moreover, the body axis projection may further include Gaussian distributions about each body-axis line, where each Gaussian distribution represents the distribution of blob pixels about the respective body-axis line. When projected to the ground plane, these distributions may overlap, which may aid in the determination of the location point 87 or which may be merged with the synergy map.

A second approach to fusion may use a 3D stereo and/or voxel representation depth map together with foreground blob projection to pre-filter the image. Once pre-filtered, the system may perform a multi-plane body axis analysis within those filtered regions to provide a higher confidence extraction of the body-axis in each view.

Referring again to FIG. 4, in block 52, one or more motion tracks may be assembled based on the determined multi-view homography information and color profile. These motion tracks may represent the ordered motion of a detected human throughout the workspace. In one configuration, the motion tracks are filtered using Kalman filtering. In the Kalman filtering, the state variables are the person's ground location and velocity.

In block 53, the system may determine if a user track matches an expected or acceptable track for a particular procedure. Additionally, the system may also attempt to "anticipate" the person's intention to continue to travel in a certain direction. This intention information can be used in other modules to calculate the closing rate of time and distance between the person and the detection zone (this is especially important in improving zone detection latency with dynamic detection zones that follow the movement of equipment, such as robots, conveyors, forklifts and other mobile equipment). This is also important information that can anticipate the person's movement into an adjoining monitored area where the person's data can be transferred and the receiving system can prepare attention mechanisms to quickly acquire tracking of the individual in the entered monitored area.

If a person's determined activity is not validated or outside of acceptable procedures, or if a person is anticipated to leave a pre-defined "safe zone," in block 54 the system may provide an alert that conveys the warning to the user. For example, the alert may be displayed on a display device as persons walk through the pre-defined safe zones, warning zones, and critical zones of the workspace area. The warning zone and the critical zones (as well as any other zones desired to be configured in the system, including dynamic zones) are operating areas where alerts are provided, as initiated in block 54, when the person has entered the respective zone and is causing the equipment to slow, stop or otherwise avoid the person. The warning zone is an area where the person is first alerted to the fact that person has entered an area and is sufficiently close to the moveable equipment and could cause the equipment to stop. The critical zone is a location (e.g., envelope) which is designed within the warning zone. A more critical alert may be issued when the person is within the critical zone so that the person is aware of their location in critical zone or is requested to leave the critical zone. These alerts are provided to improve productivity of the process system by preventing nuisance equipment shutdowns caused by casual entry into the warning zones by persons who are unaware of their proximity. These alerts are also muted by the system during intervals of expected interaction such as routine loading or unloading parts from the process. It is also possible that a momentarily stationary person would be detected in the path of a dynamic zone that is moving in his direction.

In addition to alerts provided to the person when in the respective zones, the alert may modify or alter movement of proximate automated equipment (e.g., the equipment may be stopped, sped up, or slowed down) depending upon the predicted path of travel of the person (or possibly the dynamic zone) within the workspace area. That is, the movement of the automated equipment will operate under a set routine that has predefined movements at a predefined speed. By tracking and predicting the movements of the person within the workspace area, the movement of the automated equipment may be modified (i.e., slowed or sped up) to avoid any potential contact with the person within the workspace zone. This allows the equipment to maintain operation without having to shut the assembly/manufacturing process down. Current failsafe operations are governed by the results of a task based risk assessment and usually requires that factory automated equipment be completely stopped when a person is detected in a critical area. Startup procedures require an operator of the equipment to reset the controls to restart the assembly/manufacturing process. Such unexpected stoppage in the process usually results in downtime and loss of productivity.

Activity Sequence Monitoring

In one configuration, the above-described system may be used to monitor a series of operations performed by a user, and to verify if the monitored process is being properly performed. In addition to merely analyzing video feeds, the system may further monitor the timing and use of ancillary equipment, such as torque guns, nut runners, or screw drivers.

FIG. 7 generally illustrates a method 100 of performing activity sequence monitoring using the above system. As shown, the input video is processed at 102 to generate an internal representation 104 that captures different kinds of information such as scene motion, activities, etc. The representations are used to learn classifiers at 106 which generate action labels and action similarity scores. This information is collated together and converted into a semantic description at 108 which is then compared with a known activity template at 110 to generate an error proofing score. A semantic and video synopsis is archived for future reference. An alert is thrown at 112 if the match with the template produces a low score indicating that the executed sequence is not similar to the expected work-task progression.

This process may be used to validate an operator's activity by determining when and where certain actions are performed, together with their order. For example, if the system identifies that the operator reaches into a particularly located bin, walks toward a corner of a vehicle on the assembly line, crouches, and actuates a nut runner, the system may determine that there is a high probability that the operator secured a wheel to the vehicle. If however, the sequence ends with only three wheels being secured, it may indicate/alert that the process was not completed, as a fourth wheel is required. In a similar manner, the system may match actions with a vehicle manifest to ensure that the required hardware options for a specific vehicle are being installed. If, for example, the system detects that the operator reaches for a bezel of an incorrect color, the system may alert the user to verify the part before proceeding. In this manner, the human monitoring system may be used as an error proofing tool to ensure that required actions are performed during the assembly process.

The system may have sufficient flexibility to accommodate multiple different ways of performing a sequence of tasks, and may validate the process as long as the final human track and activity listing accomplishes the pre-specified goals, at the pre-specified vehicle locations. While efficiency may not be factored into whether a sequence of actions correctly met the objectives for an assembly station, it may be separately recorded. In this manner, the actual motion track and activity log may be compared with an optimized motion track to quantify a total deviation, which may be used to suggest process efficiency improvements (e.g., via a display or printed activity report).

FIG. 8 provides a more detailed block diagram 120 of the activity monitoring scheme. As shown, video data streams are collected from the cameras in block 32. These data streams are passed through a system integrity monitoring module at 33 that verifies that the imagery is a normal operating regime. If the video feeds fall out of the normal operating regime an error is thrown and the system fails to a safe mode. The next step after the system integrity monitoring is a human detector-tracker module 122, which is generally described above in FIG. 4. This module 122 takes each of the video feeds and detects the moving humans in the scene. Once candidate moving blobs are available, the system may use classifiers to process and filter out the non-moving instances. The resulting output of this module is 3D human tracks. The next step involves extracting suitable representations at 124 from the 3D human tracks. The representation schemes are complimentary and include image pixels 126 for appearance modeling of activities, space-time interest points (STIPs) 128 to represent scene motion, tracks 130 to isolate actors from the background, and voxels 132 that integrate information across multiple views. Each of these representation schemes is described in more detail below.

Once the information is extracted and represented in the above complementary forms at 104, the system extracts certain features and passes them through a corresponding set of pre-trained classifiers. A temporal SVM classifier 134 operates on the STIP features 128 and generates action labels 136 such as standing squatting, walking, bending, etc, a spatial SVM classifier 138 operates on the raw image pixels 126 and generates action labels 140, the extracted track information 130 along with action labels is used with dynamic time warping 142 to compare tracks to typical expected tracks and generate an action similarity score 144. A human pose estimation classifier 146 is trained so it can take a voxel representation 132 as input and generate a pose estimate 148 as output. The resulting combination of temporal, spatial, track comparison, and voxel-based pose are put into a spatio-temporal signature 150 which becomes the building block for the semantic description module 152. This information is then used to decompose any activity sequence into constituent atomic actions and generate an AND-OR graph 154. The extracted AND-OR graph 154 is then compared with a prescribed activity scroll and a matching score is generated at 156. A low matching score is used to throw an alert indicating that the observed action is not typical and instead anomalous. A semantic and visual synopsis is generated and archived at 158.

Spatiotemporal Interest Points (STIPs) for Representing Actions

STIPs 128 are detected features that exhibit significant local change in image characteristics across space and/or time. Many of these interest points are generated during the execution of an action by a human. Using the STIPs 128, the system can attempt to determine what action is occurring within the observed video sequence. Each extracted STIP feature 128 is passed through the set of SVM classifiers at 134 and a voting mechanism determines which action the feature is most likely associated with. A sliding window then determines the detected action in each frame, based on the classification of the detected STIPs within the time window. Since there are multiple views, the window considers all the detected features from all of the views. The resulting information in the form of action per frame can be condensed into a graph displaying the sequence of detected actions. Finally, this graph may be matched with the graph generated during the training phase of the SVM to verify the correctness of the detected action sequence.

In one example, STIPs 128 may be generated while observing a person moving across a platform to use a torque gun at particular regions of the car. This action may involve the person transitioning from a walking pose to one of many drill poses, holding that pose for a short while, and transitioning back to a walking pose. Because STIPs are motion based interest points, the ones that are generated going into and coming out of each pose are what differentiates one action from another Dynamic Time Warping Dynamic time warping (DTW) (performed at 142) is an algorithm for measuring similarity between two sequences which may vary in time or speed. For instance, similarities in walking patterns between two tracks would be detected via DTW, even if in one sequence the person was walking slowly and if in another he were walking more quickly, or even if there were accelerations, decelerations or multiple short stops, or even if two sequences shift in timeline during the course of one observation. DTW can reliably find an optimal match between two given sequences (e.g. time series). The sequences are "warped" non-linearly in the time dimension to determine a measure of their similarity independent of certain non-linear variations in the time dimension. The DTW algorithm uses a dynamic programming technique to solve this problem. The first step is to compare each point in one signal with every point in the second signal, generating a matrix. The second step is to work through this matrix, starting at the bottom-left corner (corresponding to the beginning of both sequences), and ending at the top-right (the end of both sequences). For each cell, the cumulative distance is calculated by picking the neighboring cell in the matrix to the left or beneath with the lowest cumulative distance, and adding this value to the distance of the focal cell. When this process is complete, the value in the top-right hand cell represents the distance between the two sequences signals according to the most efficient pathway through the matrix.

DTW can measure the similarity using track only or track plus location labels. In a vehicle assembly context, six location labels may be used: FD, MD RD, RP, FP and walking, where F, R M represent front, middle and rear of the car and D and P represent driver and passenger sides, respectively. The distance cost of DTW is calculated as:

$$\text{cost} = \alpha E + (1-\alpha)L, \; 0 \le \alpha \le 1$$

where, E is the Euclidean distance between two points on the two tracks, and L is the histogram difference of locations within a certain time window; $\alpha$ is a weight and set to 0.8 if both track and location labels are used for DTW measurement. Otherwise, $\alpha$ is equal to 1 for track only measurement.

Action Labels Using Spatial Classifiers

A single-image recognition system may be used to discriminate among a number of possible gross actions visible in the data: e.g., walk, bend, crouch, and reach. These action labels may be determined using scale-invariant feature transforms (SIFT) and SVM classifiers. At the lowest level of most categorization techniques is a method to encode an image in a way that is insensitive to the various nuisances that can arise in the image formation process (lighting, pose, viewpoint, and occlusions). SIFT descriptors are known in the art to be insensitive to illumination, robust to small variations in pose and viewpoint, and can be invariant to scale and orientation changes. The SIFT descriptor is computed within a circular image region around a point at a particular scale, which determines the radius of the domain and the requisite image blur. After blurring the image, gradient orientation and magnitude are found, and a grid of spatial bins tile the circular image domain. The final descriptor is a normalized histogram of gradient orientations weighted by magnitude (with a Gaussian weight decreasing from the center), separated by spatial bin. Therefore, if the spatial bin grid is 4×4 and there are 8 orientation bins, the descriptor has size 4*4*8=128 bins. While the locations, scales, and orientations of SIFT descriptors can be chosen in ways that are invariant to pose and viewpoint, most state-of-the-art categorization techniques use fixed scales and orientations, and arrange the descriptors in a grid of overlapping domains. Not only does this boost performance, it allows for very fast computation of all descriptors in an image.

In order for a visual category to be generalizable, there must be some visual similarities amongst the members of the class and some distinctiveness when compared to non-members. Additionally, any large set of images will have a wide variety of redundant data (walls, floor, etc.). This leads to the notion of "visual words"—a small set of prototype descriptors that are derived from the entire collection of training descriptors using a vector quantization technique such as k-means clustering. Once the set of visual words is computed—know as the codebook—images can be described solely in terms of which words occur where and at what frequencies. We use k-means clustering to create the codebook. This algorithm seeks k centers within the space of the data, each of which represents a collection of data points that fall closest to it in that space. After the k cluster centers (the codebook) are learned from training SIFT descriptors, any new SIFT descriptor's visual word is simply the cluster center that is closest to it.

After an image is broken down into SIFT descriptors and visual words, those visual words can be used to form a descriptor for the entire image, which is simply a histogram of all visual words in the image. Optionally, images can be broken down into spatial bins and these image histograms can be spatially separated in the same way SIFT descriptors are computed. This adds some loose geometry to the process of learning actions from raw pixel information.

The final step of the process for learning visual categories is to train a support vector machine (SVM) to discriminate amongst the classes given examples of their image histograms.

In the present context, the image-based technique may be used to recognize certain human actions, such as bend, crouch, and reach. Each "action" may involve a collection of sequential frames that are grouped together, and the system may only use the portion of an image in which the human of interest is present. As we have multiple simultaneous views, the system may train one SVM per view, where each view's SVM evaluates (or is trained with) each frame of an action. A vote tally may then be computed across all SVM frames over all views for a particular action. The action is classified as the class with the highest overall vote.

The system may then use the human tracker module to determine both where the person is in any view at any time, as well as to decide which frames are relevant to the classification process. First, the ground tracks may be used to determine when the person in the frame is performing an action of interest. Since the only way the person can move significantly is by walking, we assume that any frames which correspond to large motions on the ground contain images of the person walking We therefore do not need to classify these frames with the image-based categorizer.

When analyzing a motion track, long periods of little motion, in between periods of motion, indicate frames where the person is performing an action other than walking Frames that correspond to long periods of small motion are separated into groups, each of which constitutes an unknown action (or a labeled action, if used for training) Within these frames, the human tracker provides a bounding-box that specifies what portion of the image contains the person. As noted above, the bounding-box may be specified in a rectified image space to facilitate more accurate training and recognition.

Once the frames of interest and bounding boxes are found through the human tracker, the procedure for training of the SVMs is very similar to the traditional case. SIFT descriptors are computed within each action image bounding box—across all frames and all views. Within each view, those images which belong to an action (ie grouped together temporally) are labeled by hand for SVM training K-means clustering builds a codebook, which is then used to create image histograms for each bounding box. Image histograms derived from a view are used to train its SVM. In a system with, for example, six cameras, there are six SVMs, each of which classify the three possible actions.

Given a new sequence, a number of unlabeled actions are extracted in the manner described above. These frames and bounding boxes are each classified using the appropriate view-based SVM. Each of the SVMs produces scores for each frame of the action sequence. These are added together to compute a cumulative score for the action across all frames and all views. The action (category) that has the highest score is selected as the label for the action sequence.

At various times, the person may be occluded in a particular view, but visible in others. Occluded views cast votes equal to zero for all categories. We achieve increased accuracy using one sequence for labeled training and 4 different sequences for testing. It is important to note that the same codebook developed during training is used at testing time, otherwise the SVMs would not be able to classify the resultant image histograms.

The system may employ a voxel-based reconstruction method that uses the foreground moving objects from the multiple views to reconstruct 3D volume by projecting 3D voxels onto each of the image planes and determining if the project overlaps with the respective silhouettes of foreground objects. Once the 3D reconstruction is complete the system may, for example, fit cylindrical models to the different parts and use the parameters to train a classifier that estimates the pose of the human.

The representation and learning steps in the block diagram of FIG. 6 are then combined with any external signals such as may be output from one or more ancillary tools (e.g., torque guns, nut runners, screw drivers, etc) to form a spatio-temporal signature. This combined information is then used to build AND-OR graphs at 154. In general, AND-OR graphs are capable of describing more complicated scenarios than a simple tree graph. The graph consist of two kinds of nodes; "Or" nodes which are the same nodes in a typical tree graph, and "And" nodes which allow a path down the tree to split into multiple simultaneous paths. We use this structure to describe the acceptable sequences of actions occurring in a scene. The "And" nodes in this context allow us to describe events such as action A occurs then, actions B and C occur together or D occurs, something a standard tree graph cannot describe.

In another configuration, instead of AND-OR graphs at 154, the system may employ finite state machines to describe the user activity. Finite state machines are often used for describing systems with several states along with the conditions for transition between the states. After an activity recognition system temporally segments a sequence into elemental actions, the system may evaluate the sequence to determine if it conforms to a set of approved action sequences. The set of approved sequences may also be learned from data, such as by constructing a finite state machine (FSM) from training data, and testing any sequence by passing it through the FSM.

Creating a FSM that represents the entire set of valid action sequences is straightforward. Given a group of training sequences (already classified using the action recognition system), first create the nodes of the FSM by finding the union of all unique action labels across all training sequences. Once the nodes are created, the system may place a directed edge from node A to node B if node B immediately follows node A in any training sequence.

Testing a given sequence is equally straightforward: pass the sequence through the machine to determine if it reaches the Exit state. If it does, the sequence is valid, otherwise, it is not.

Since the system knows the position of the person when each activity is performed, it may also include spatial information in the structure of the FSM. This adds additional detail and the possibility to evaluate an activity in terms of position, not just sequence of events.

Video Synopsis

This video synopsis module 158 of FIG. 8 takes the input video sequences and represents dynamic activities in a very efficient and compact form for interpretation and archival. The resulting synopsis maximizes information by showing multiple activities simultaneously. In one approach, a back ground view is selected and foreground objects from selected frames are extracted and blended into the base view. The frame selection is based on the action labels obtained by the system and allows us to select those sub-sequences where some action of interest is happening.

Multiple Workspaces

The human monitoring system as described herein thoroughly detects and monitors a person within the workspace area from a plurality of different viewpoints such that the occlusion of a person in one or more of the viewpoints does not affect the tracking of the person. Moreover, the human monitoring system can adjust and dynamically reconfigure the automated moveable factory equipment to avoid potential interactions with the person of within the workspace area without having to stop the automated equipment. This may include determining and traversing a new path of travel for the automated moveable equipment. The human monitoring system can track multiple people within a workspace area, transfer tracking to other systems responsible for monitoring adjoining areas and various zones can be defined for multiple locations within the workspace area.

Figure 9:
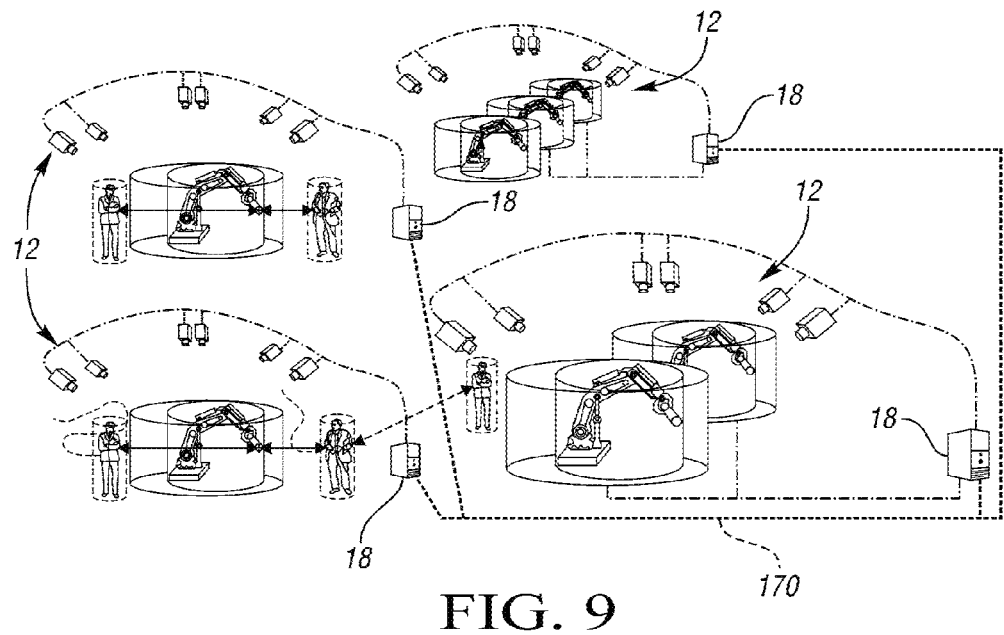
FIG. 9 is a schematic illustration of the human monitoring system used across multiple workspace areas.

FIG. 9 shows a graphic illustration of multiple workspace areas. The sensing devices 12 for a respective workspace area are coupled to a respective processing unit 18 dedicated to the respective workspace area. Each respective processing unit identifies and tracks the proximity of people transitioning within its respective workspace area and communicates to one another over a network link 170 so that individuals can be tracked as they transition from one workspace area to another. As a result, multiple visual supervision systems can be linked for tracking individuals as they interact among the various workspace areas.

It should be understood that the use of the vision monitoring system in a factory environment as described herein is only one example of where the vision monitoring system can be utilized and that this vision monitoring system has the capability to be applied in any application outside of a factory environment where the activities of people in an area are tracked and the motion and activity is logged.

The vision monitoring system is useful in the automated time and motion study of activities that can be used to monitor performance and provide data for use in improving work cell activity efficiency and productivity. This capability can also enable activity monitoring within a prescribed sequence where deviations in the sequence can be identified, logged and alerts can be generated for the detection of human task errors. This "error proofing" capability can be utilized to prevent task errors from propagating to downstream operations and causing quality and productivity problems due to mistakes in sequence or proper material selection for the prescribed task.

It should also be understood that a variation of the human monitoring capability of this system as described herein is monitoring restricted areas that may have significant automated or other equipment activity that only requires periodic service or access. This system would monitor the integrity of access controls to such areas and trigger alerts due to unauthorized access. Since service or routine maintenance in this area may be needed on off shifts or other downtime, the system would monitor authorized access and operations of a person (or persons) and would trigger alerts locally and with a remote monitoring station if activity unexpectedly stops due to accident or medical emergency. This capability could improve productivity for these types of tasks where the system could be considered part of a "buddy system."

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A human monitoring system for monitoring a workspace area having automated moveable equipment, the system comprising:
a plurality of cameras disposed about the workspace area, each camera configured to capture a video feed that includes a plurality of image frames;
a visual processor configured to:
receive the plurality of image frames from the plurality of cameras;
detect the presence of a human from at least one of the plurality of image frames using pattern matching performed on an input image;
wherein the input image to the pattern matching is a sliding window portion of the at least one image frame;
wherein the sliding window portion is aligned with a rectified coordinate system such that a vertical axis in the workspace area is aligned with a vertical axis of the input image; and
provide an alert if the detected human is proximate the automated moveable equipment.

2. The system of claim 1, wherein the rectified coordinate system is established according to at least one of a perspective of the workspace area within the at least one image frame, and a vanishing point of the at least one image frame.

3. The system of claim 1, wherein the pattern matching includes at least one of a support vector machine and a neural network.

4. The system of claim 1, wherein the pattern matching can further detect the pose of the human, and wherein the pose includes at least one of standing, walking, reaching, and crouching.

5. The system of claim 1, wherein the visual processor is further configured to select the sliding window from a region of interest within the at least one image frame;
wherein the region of interest is a subset of the at least one image frame that is a possible area for a human to be located; and
wherein the region of interest includes a portion of the floor of the workspace area.

6. The system of claim 5, wherein the sliding window traverses the entire region of interest in a first image frame prior to detecting the presence of a human a subsequent image frame.

7. The system of claim 1, wherein the visual processor uses a position and a velocity of a detected human in a first frame to prioritize the detection in a subsequent frame.

8. The system of claim 1, wherein the visual processor is further configured to fuse the time-synchronized image frames from the plurality of views into a common coordinate system; and
wherein visual processor is configured to identify the location of the detected human in the common coordinate system by mapping a representation of the human from the plurality of views into the common coordinate system, and by determining a point of intersection of the mapped representations.

9. The system of claim 8, wherein the visual processor is further configured to assemble a motion track of the detected human according to the identified location across a plurality of successive image frames.

10. The system of claim 9, wherein the visual processor is further configured to:
compare the motion track to a predetermined, expected motion track; and
provide an alert if the motion track is not similar to the expected motion track.

11. A human monitoring system for monitoring a workspace area having automated moveable equipment, the system comprising:
a plurality of cameras disposed about the workspace area, each camera configured to capture a video feed that includes a plurality of image frames;
a visual processor configured to:
receive the plurality of image frames from the plurality of cameras;
detect the presence of a human from at least one of the plurality of image frames using a support vector machine executed using an input image;
wherein the input image to the support vector machine is a sliding window portion of the at least one image frame;
wherein the sliding window portion is aligned with a rectified coordinate system such that a vertical axis in the workspace area is aligned with a vertical axis of the input image;
wherein the rectified coordinate system is established according to at least one of a perspective of the workspace area within the at least one image frame, and a vanishing point of the at least one image frame; and
provide an alert if the detected human is proximate the automated moveable equipment.

12. The system of claim 11, wherein the support vector machine can further detect the pose of the human, and wherein the pose includes at least one of standing, walking, reaching, and crouching.

13. The system of claim 11, wherein the visual processor is further configured to select the sliding window from a region of interest within the at least one image frame;

wherein the region of interest is a subset of the at least one image frame that is a possible area for a human to be located; and wherein the region of interest includes a portion of the floor of the workspace area.

14. The system of claim 13, wherein the sliding window traverses the entire region of interest in a first image frame prior to detecting the presence of a human a subsequent image frame.

15. The system of claim 11, wherein the visual processor uses a position and a velocity of a detected human in a first frame to prioritize the detection in a subsequent frame.

16. The system of claim 11, wherein the visual processor is further configured to fuse the time-synchronized image frames from the plurality of views into a common coordinate system; and wherein visual processor is configured to identify the location of the detected human in the common coordinate system by mapping a representation of the human from the plurality of views into the common coordinate system, and by determining a point of intersection of the mapped representations.

17. The system of claim 16, wherein the visual processor is further configured to assemble a motion track of the detected human according to the identified location across a plurality of successive image frames.

18. The system of claim 17, wherein the visual processor is further configured to:

compare the motion track to a predetermined, expected motion track; and provide an alert if the motion track is not similar to the expected motion track.

* * * * *